INVENTOR.
Frank J. Winchell
BY
W. C. Middleton
ATTORNEY

Oct. 10, 1961

F. J. WINCHELL 3,003,367

SPLIT TORQUE TRANSMISSION

Filed May 1, 1958

INVENTOR.
Frank J. Winchell
BY
W. C. Middleton
ATTORNEY

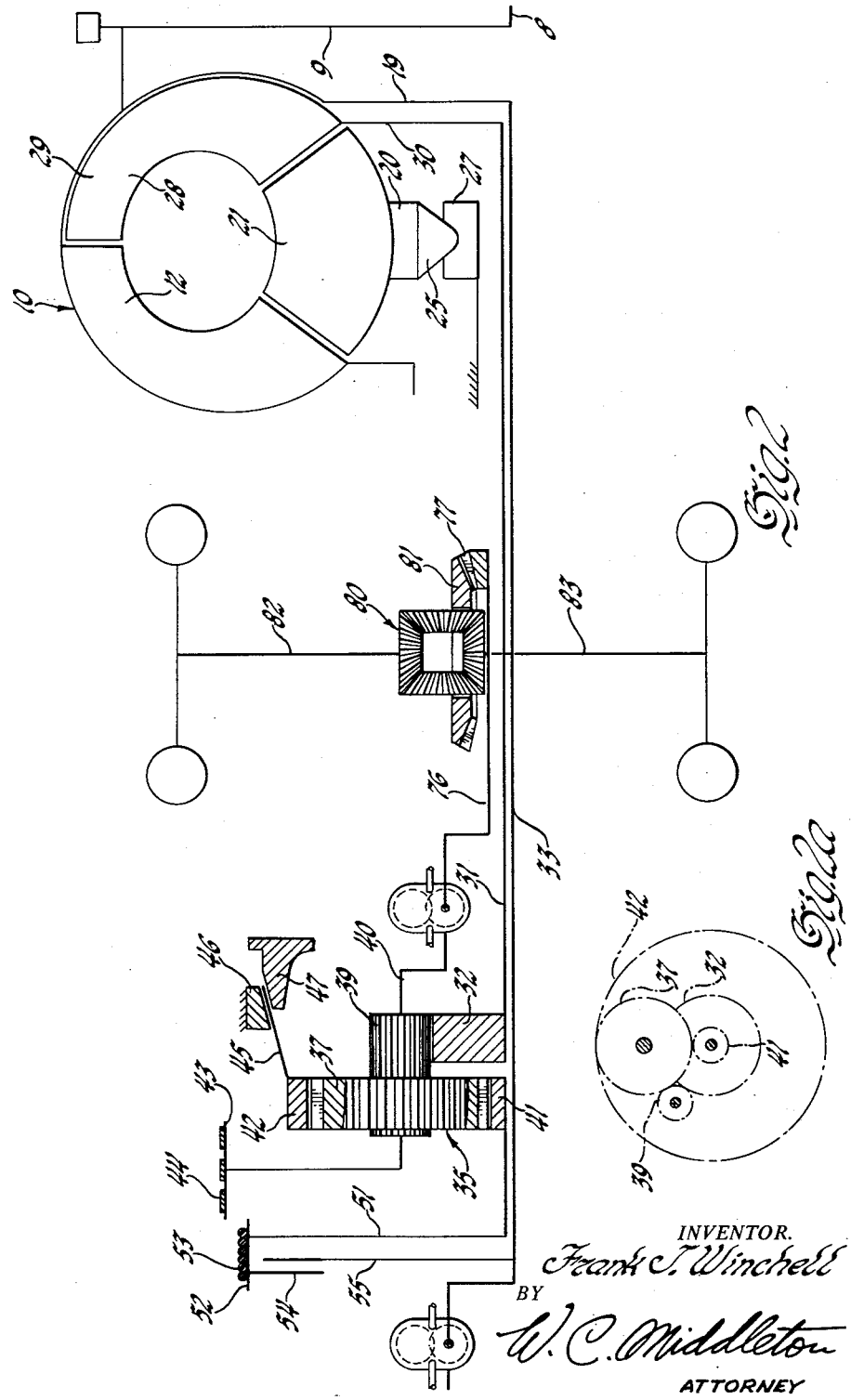

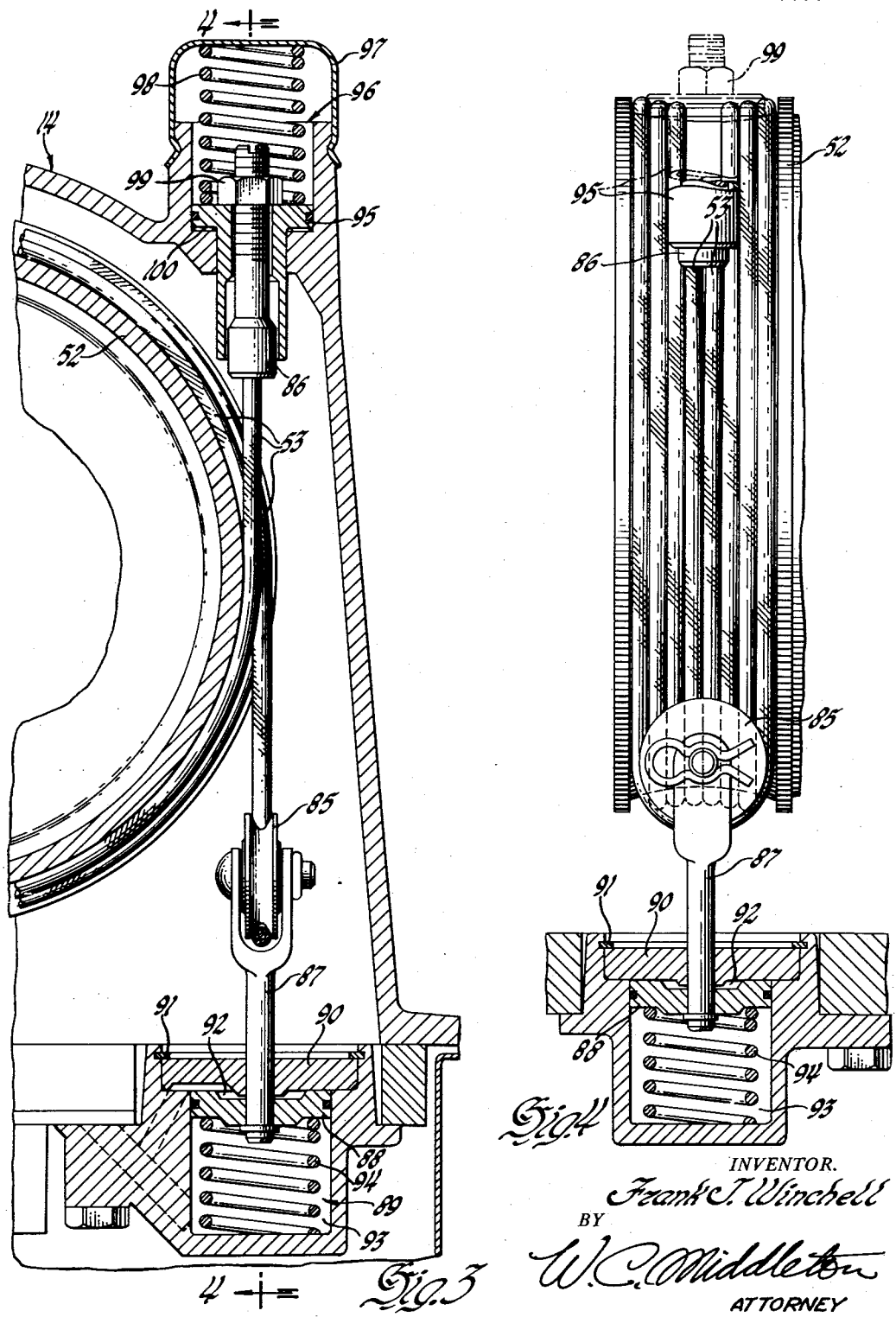

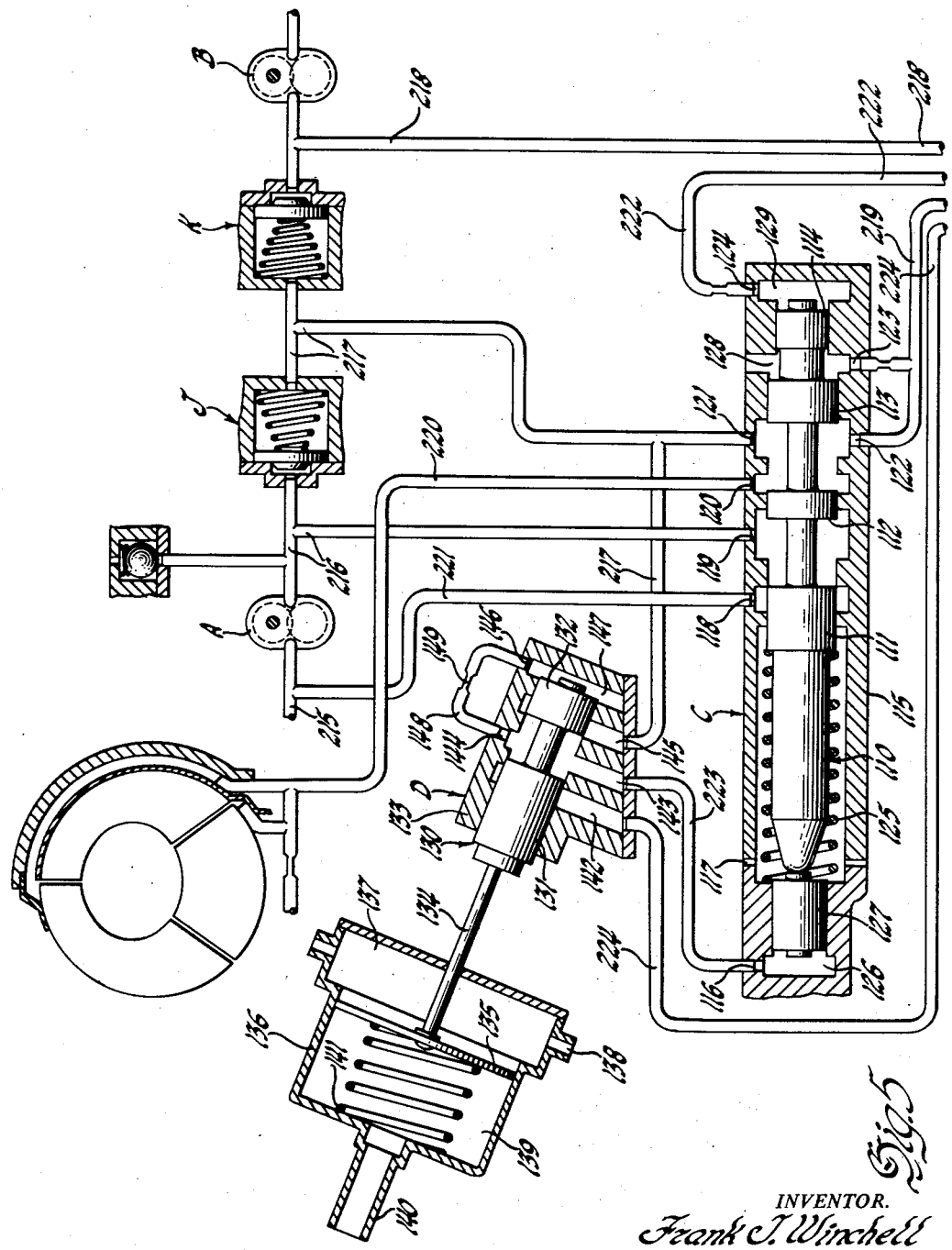

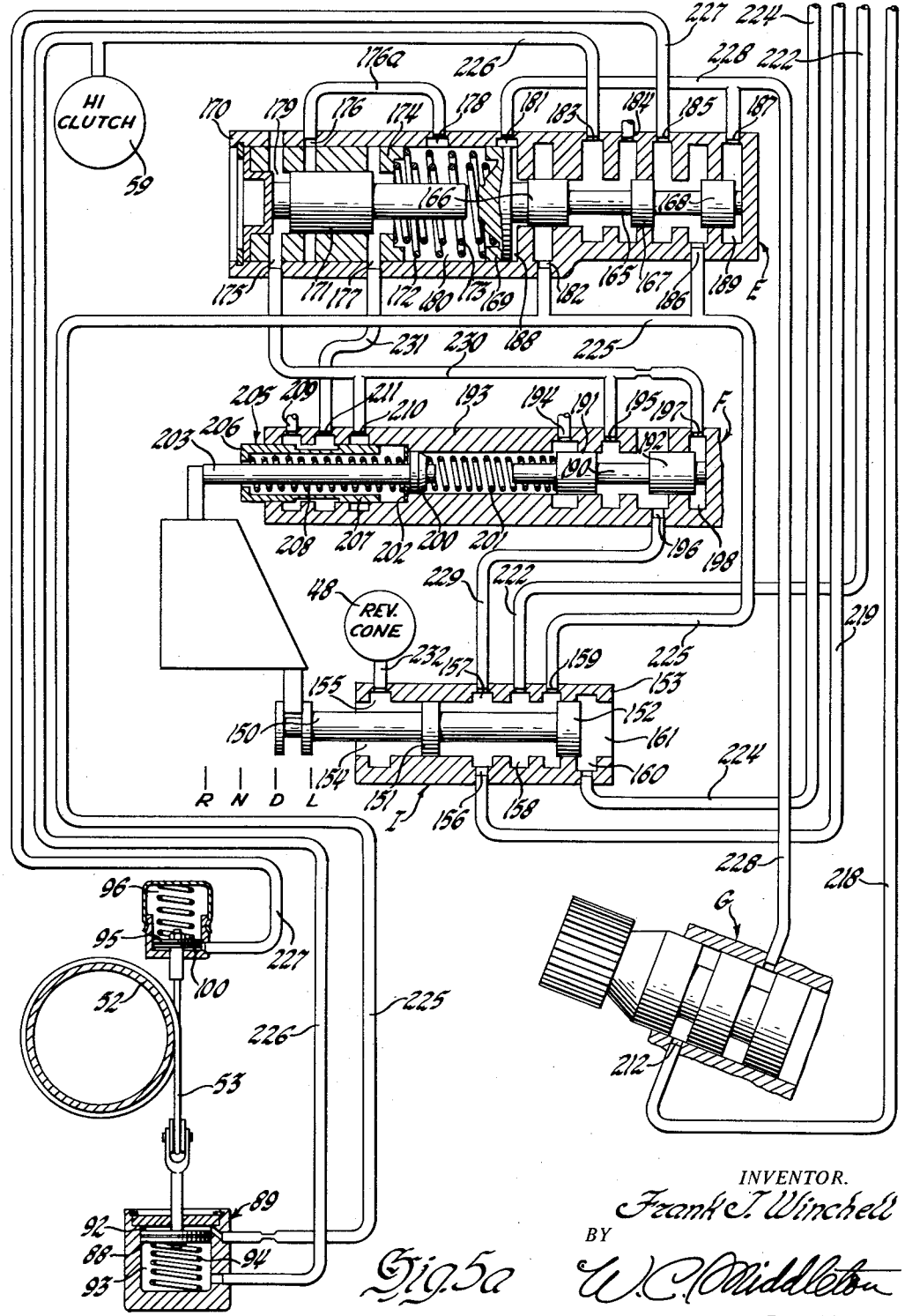

United States Patent Office 3,003,367
Patented Oct. 10, 1961

---

3,003,367
SPLIT TORQUE TRANSMISSION
Frank J. Winchell, Bloomfield Hills, Mich., assignor to General Motors Corporation, Detroit, Mich., a corporation of Delaware
Filed May 1, 1958, Ser. No. 732,213
23 Claims. (Cl. 74—688)

This invention relates to transmissions and more particularly to improvements in transmissions of the type incorporating a hydrodynamic torque converter and planetary gearing. The hydrodynamic torque converter and planetary gearing assembly are arranged such that the gear unit is driven solely by the torque converter when the gear unit is in reduction drive but is driven partially by the torque converter and partly through a direct mechanical drive connection when the gear unit is conditioned for direct drive. This latter type of drive connection including a partial hydraulic drive of the gearing by the turbine of the torque converter and partial direct mechanical drive of the gearing by the engine is termed a split torque drive. This drive arrangement is believed novel in hydraulic torque converter and planetary gearing combinations. The improved transmission assembly further contemplates the use of a pair of concentric power shafts for transmitting power to the planetary gearing and a final power delivery shaft from the planetary gearing unit concentric with the first-mentioned pair of shafts and terminating in the space intermediate the torque converter and gearing unit. An additional feature is the provision of a novel cable brake and servo arrangement for braking the reaction member of the planetary gearing unit.

Accordingly, an object of this invention is to provide a transmission including a hydrodynamic torque converter and planetary gearing unit arranged such that the planetary gearing unit is driven solely through the torque converter turbine when the gear unit is conditioned for reduction drive and wherein the gear unit has one element driven by the torque converter turbine and a second element driven directly by the engine when the gear unit is conditioned for direct drive.

Another object of this invention is to provide a novel transmission of the class described including a hydrodynamic torque converter and a planetary gearing unit spaced from the converter including a pair of concentric power input shafts extending between the converter and gear unit for transmitting power to the gear unit and a gear unit power delivery shaft concentric with the first two shafts and terminating in the space between the converter and gear unit.

A further object of this invention is to provide a transmission for driving a vehicle wherein the transmission planetary gear unit is furnished with a power delivery shaft extending into the space between the torque converter and gear unit so that the transmission may be mounted in the vehicle with the converter at one side of the vehicle axle and the gear unit at the opposite side of the vehicle axle to minimize the vertical space requirement above the axle.

An additional object of this invention is to provide a transmission of compact design, which meets minimum space requirements, and which is particularly adapted to be mounted longitudinally in the vehicle it is to drive having a torque converter located at one side of the vehicle drive axle, a gear unit positioned on the opposite side of the axle, and a power delivery shaft extending into the space between the converter and gear unit and terminating adjacent the drive axle when the transmission is assembled in the vehicle.

Another object of this invention is to provide a novel cable brake and servo arrangement for braking the reaction element of the planetary gearing unit having a high capacity and arranged to assure smooth brake application with minimum shock loading.

A further object of this invention is to provide a transmission including a torque converter and planetary gearing unit spaced from each other wherein the power delivery shaft of the gearing unit extends into the space between the two units and wherein one element of the gear unit is driven by a turbine driven shaft extending through the power delivery shaft and wherein a second element of the gear unit is driven by an engine driven shaft extending through the torque converter driven shaft and independently of the torque converter in high range operation of the gear unit.

These and other objects of this invention will be apparent from the following description and claims taken in conjunction with the accompanying drawings in which:

FIGURE 2 is a schematic diagram of the transmission illustrating the arrangement of the transmission with respect to the vehicle drive axle when installed in a vehicle.

FIGURE 2a is a schematic drawing illustrating the mesh relationship of the gears of the planetary gearing unit.

FIGURE 3 is a sectional view of the brake cable, drum and servos for the reaction member of the planetary gearing unit taken along the line 3—3 of FIGURE 1a.

FIGURE 4 is a sectional view taken along the line 4—4 of FIGURE 3.

FIGURE 5 is a schematic diagram of a portion of a hydraulic control system for controlling the operation of the transmission.

FIGURE 5a is a schematic diagram of the remaining portion of the hydraulic control system for controlling the operation of the transmission.

Figure 1:
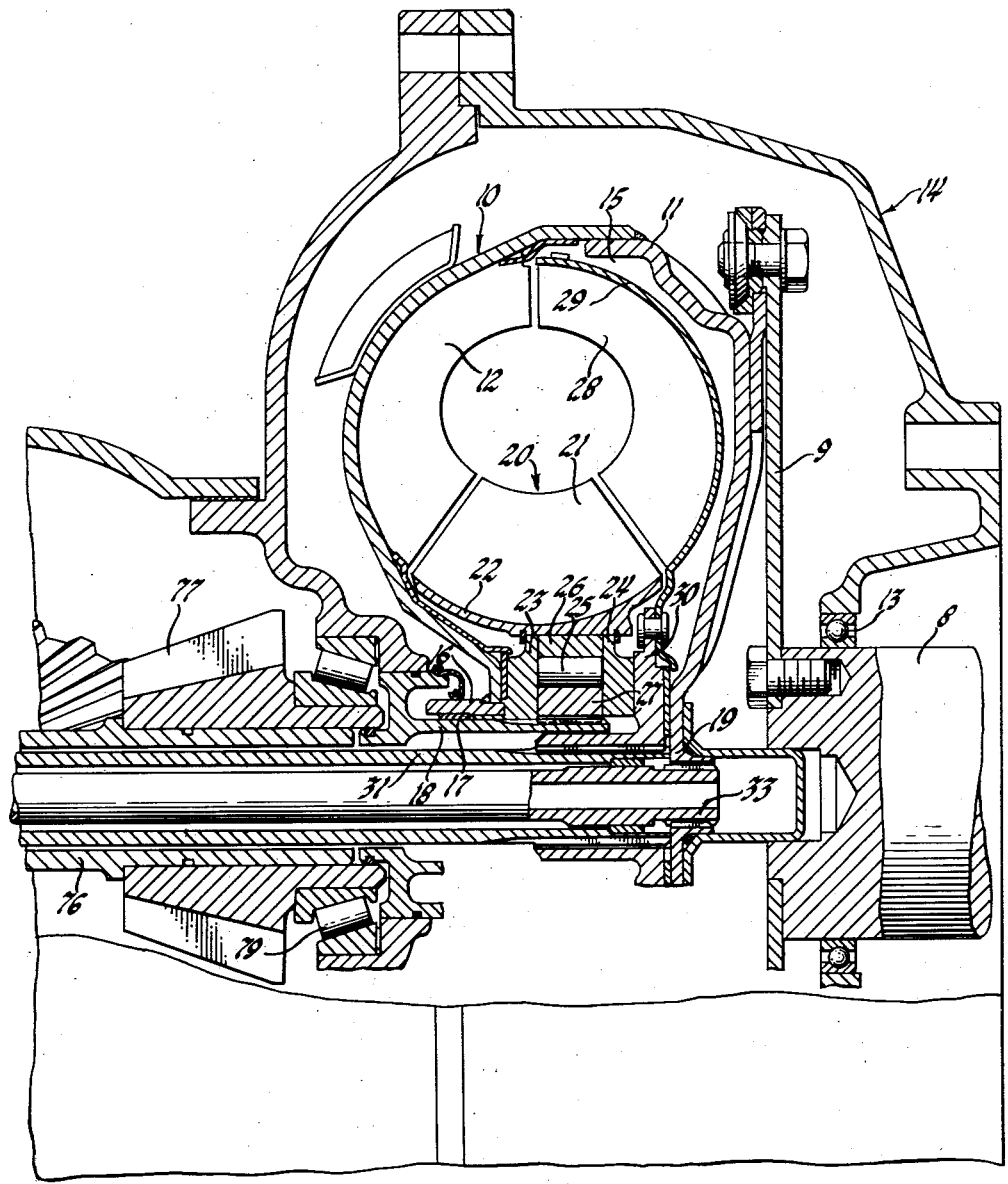
FIGURE 1 is a longitudinal section of the front portion of a transmission embodying the features of this invention.
Figure 1A:
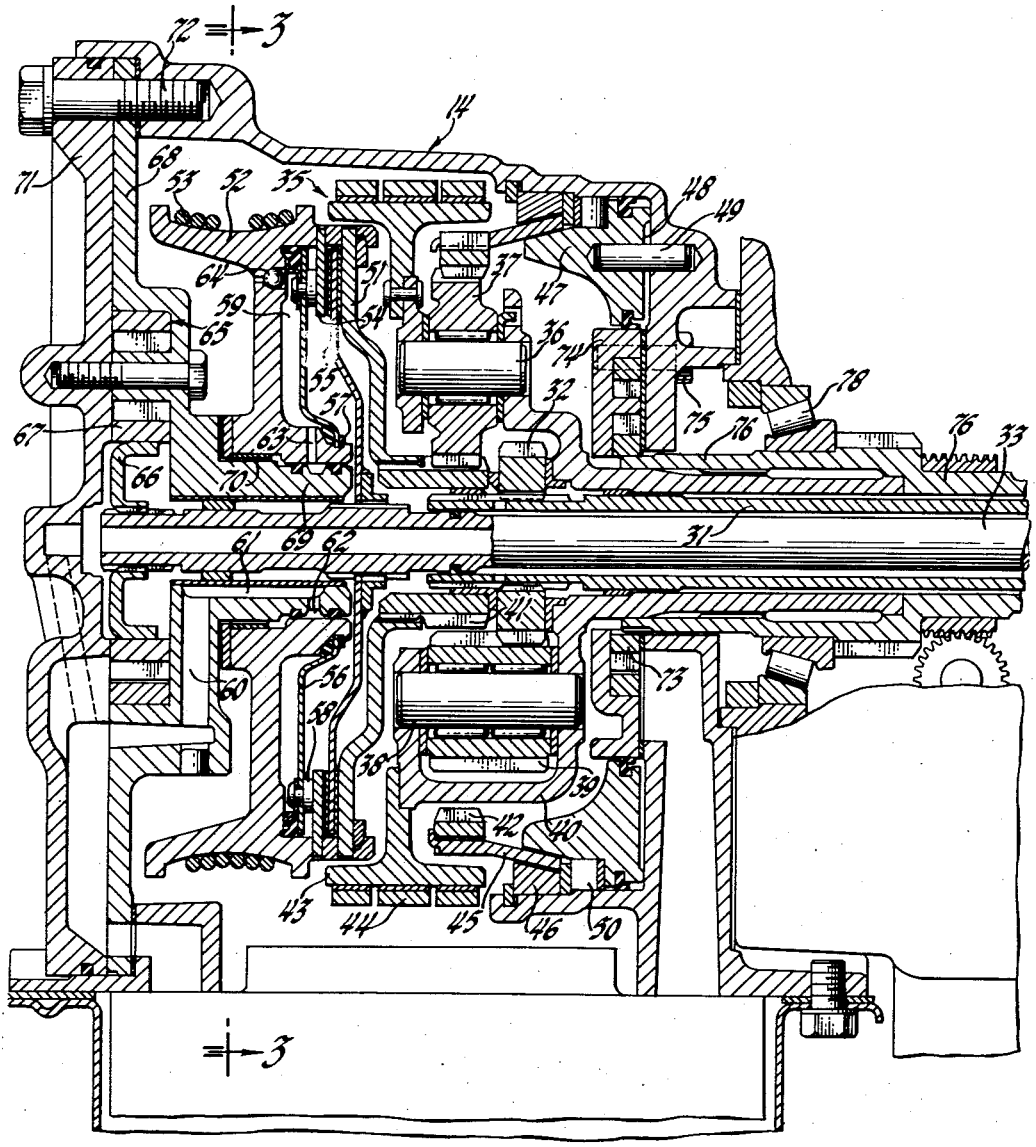
FIGURE 1a is a longitudinal section of the rear portion of a transmission embodying the features of the invention.

In FIGURE 1 there is shown a hydrodynamic torque transmitting unit indicated generally at 10 including an impeller shroud 11 carrying impeller blades 12 affixed thereto for rotation therewith. Shroud 11 is adapted to be driven by an engine crankshaft 8 by means of a drive plate 9 extending between crankshaft 8 and shroud 11. A bearing 13 supports power input member 8 in the transmission case 14 at the front end of the case. Shroud 11 is shaped to form a chamber 15 adapted to contain a working fluid such as oil. At one end shroud 11 terminates in a hub 16 separated from a transmission housing extension 18 by means of a bushing 17. At the opposite end shroud 11 terminates in a hub 19 splined to a clutch drive shaft 33 to provide a direct mechanical drive of shaft 33 by engine crankshaft 8.

A reaction member indicated generally at 20 includes a hub 22 having reaction blades 21 affixed thereto, the hub 22 being carried by a pair of spaced support members 23 and 24. A one-way brake mechanism 25 is disposed between an outer race 26 fixed to hub 22 and an inner race 27 fixed to transmission housing extension 18. The function of the one-way brake mechanism is to prevent reverse rotation of reaction member 20 with respect to the direction of rotation of impeller blades 12 and to permit rotation of the reaction member in the direction of rotation of the impeller blades.

A shroud 29 supports turbine blades 28 upon a hub 30 splined to a turbine driven power transfer shaft 31, the shaft 31 having affixed thereto a sun gear 32 for rotation with shaft 31.

Extending intermediate the hydraulic torque converter unit 10 and a planetary gearing unit indicated generally at 35 is a hollow shaft 76 having a gear 77 affixed thereto for rotation therewith. Shaft 76 and gear 77 constitute the power delivery elements of the planetary gearing unit 35 and may drive a vehicle differential gear unit 80 as shown in FIGURE 2. Shaft 76 is driven by a planet carrier 40 which supports a plurality of relatively long planet pinion gears 39 upon planet pins 38 and a plurality of relatively short planet pinion gears 37 upon planet pins 36. Preferably there are three sets of each. Each set of relatively short planet pinion gears meshes with a corresponding set of relatively long planet pinion gears. Sun gear 32 on turbine drive shaft 31 meshes with each of the relatively long planet pinion gears 39. A ring gear 42 and a sun gear 41 each mesh with each set of short planet pinions 37.

A brake drum 43 fixed to planet carrier 40 has mounted thereon a brake band 44. Band 44 may be applied to drum 43 by any suitable mechanism (not shown) to provide a vehicle parking brake.

A cone shaped extension 45 fixed to ring gear 42 may be clamped between a backing member 46 fixed to transmission housing 14 and a cone extension upon a piston 47 upon admission of fluid under pressure to a control chamber 48. Braking of ring gear 41 will result in reverse rotation of shaft 76 and gear 77. Piston 47 is held against rotation by means of a pin 49 extending into the piston and the transmission case 14. A spring 50 will cause piston 47 to release ring gear 42 upon exhaust of pressure from chamber 48.

Sun gear 41 which meshes with short planet pinions 37 is fixed to a drum 52 by means of a connector 51. Drum 52 carries a cable brake 53 which may be applied to drum 52 to prevent rotation of sun gear 41. A clutch plate 54 is splined to drum 52 for rotation with the drum and so as to be axially movable with respect to the drum. A second clutch plate 55 splined to shaft 33 extends radially outwardly between clutch plate 54 and connector 51. A clutch piston 56 of the diaphragm type fixed to drum 52 by means of a snap ring 57, carries an annular friction surface 58 adapted to engage clutch plate 54 upon admission of fluid under pressure to a chamber 59. Pressure may be admitted to chamber 59 by way of passage 60, passage 61, port 62 and passage 63. Located in the side wall of drum 52 near the outer periphery thereof is an auxiliary dump valve 64 adapted to permit exhaust of residual fluid from chamber 59 after the passage 60 has been connected to exhaust by suitable valving, not shown. This prevents undesirable clutch drag due to centrifugal force acting upon residual fluid in clutch chamber 59. Shaft 33 drives a pump gear 67 of a gear pump indicated generally at 65 at engine crankshaft speed, the gear 67 being drivingly connected to shaft 33 by means of a drive member 66. Drum 52 is supported for rotation upon an extension 69 of pump housing 68, there being a bushing 70 between drum 52 and housing extension 69. Pump housing 68 and an end cover plate 71 are bolted to transmission housing 14 by means of bolts 72.

A pump drive gear 73 is splined to shaft 76 to rotate at the speed of output shaft 76. A pump housing 74 is bolted to transmission housing 14 by means of bolts 75. Output shaft 76 is supported in transmission housing 14 by means of a pair of spaced bearings 78 and 79.

The physical arrangement of the hydraulic torque converter, planetary gearing unit, and concentric shafts 76, 31 and 33 with the output shaft 76 extending intermediate the torque converter and planetary gearing unit is compact, which is important where space limitations exist as in modern automotive vehicles and is particularly advantageous in that it permits the transmission to be mounted over the drive axle in a fore and aft direction in the vehicle. This arrangement of the transmission with respect to the vehicle drive axle is shown schematically in FIGURE 2 wherein the gear 77 meshes with a drive gear 81 of a differential gearing unit 80 and which transmits torque to the wheel drive axles 82 and 83. By locating the hydraulic torque converter on one side of axles 82 and 83 and the planetary gearing unit on the opposite side of the axles, proper weight balance may be easily attained and the transmission may be positioned with respect to the vehicle body (not shown) such that a minimum of useful body space is required. More particularly, the transmission, being thus positioned with respect to the drive axle may be mounted with respect to the floor of the body such that the conventional "hump" in the floor of the body used to accommodate the transmission may be eliminated or minimized in size. Another important advantage of the arrangement is that it provides hydraulic torque converter and planetary gearing unit adapted to be operated in two drive ranges with "split torque" or a combination of hydraulic and direct mechanical drive available in one drive range. This important feature is believed to be novel in hydraulic torque converter and planetary gearing unit combinations.

The transmission of FIGURE 1 may be conditional to provide neutral, low range, high range, or reverse drive as hereafter explained.

Neutral

For neutral or no drive, brake cable 53 on drum 52, brake 45 on ring gear 42 and clutch 55 are released. Sun gear 32 driven by turbine shaft 31 rotates the long pinions 39 which in turn rotate the short pinions 37 in mesh therewith. Sun gear 41 and brake drum 52 are rotated by short pinions 37. Due to the load of the vehicle upon planet carrier 40, the carrier remains stationary. Since there is no fixed reaction member in the planetary gearing unit, the planet gears freely revolve about their support pins in planet carrier 40, thereby freely rotating sun gear 41 and brake drum 52.

Low range drive

For forward drive in low range, brake cable 53 is applied to drum 52 to hold sun gear 41 stationary. Clutch 55 and brake 45 are released. Drive is through turbine 29, shaft 31, sun gear 32, long pinions 39, short pinions 37, to planet carrier 40, output shaft 76 and drive gear 77. Sun gear 41 acts as a fixed reaction member so that the planet gears are caused to walk around sun gear 41, thereby driving planet carrier 40 and output shaft 76 in reduction drive as determined by the reduction drive ratio of the planetary gearing unit and the hydraulic torque multiplication of the hydraulic torque converter at any given instant. In low range operation, the power input gear 32 of the planetary gearing unit is driven at the torque multiplication of the hydraulic torque converter. Thus, the low range drive of the vehicle is a hydraulic drive.

High range drive

For high range forward operation, brake cable 53 is released and clutch plates 54 and 55 are engaged through action of diaphragm 56, thereby connecting sun gear 41 in direct mechanical drive to engine crankshaft 13. Planet gears 37 are also being rotated by turbine 29, shaft 31, sun gear 32 and planet pinions 39. Thus, the planetary gearing unit has its sun gear driven at engine shaft speed and its short planet gears driven by turbine 29. This arrangement reduces drive train losses in direct drive range operation as compared to conventional torque converter drive systems wherein drive is continuously maintained solely through a torque converter element. At the same time the advantages of continuously maintaining a torque converter turbine in the drive train are maintained. It will be understood that the drive in high range operation is a split torque drive, part of which is a direct mechanical drive and part a hydraulic drive. The drive arrangement reduces power losses, gives quick response for rapid acceleration and continuously maintains the torque converter in the drive train so that the vehicle may be stopped if desired without the necessity of releasing any clutch. Also the torque converter is effective to dampen engine vibrations in high range as well as low range operation.

*Reverse drive*

For reverse vehicle drive clutch plates 54 and 55 and brake cable 53 are released. Fluid pressure is admitted to chamber 48 to cause piston 47 to brake ring gear 42 against rotation. Ring gear 42 acts as a fixed reaction point so that power flowing from sun gear 32, long pinions 39 to short pinions 37 will cause the short pinions 37 to walk around ring gear 42 in a direction reverse to that of rotation of sun gear 32, thereby driving planet carrier 40 and output shaft 76 in reverse.

*Park*

For braking the vehicle for parking, brake band 44 may be applied to drum 43, thereby holding planet carrier 40 against rotation. At such time, the clutch plates 54 and 55 and the low brake cable 53 and reverse brake 45 will be released.

In FIGURE 2, parts shown schematically and which correspond to similar parts in FIGURE 1 are denoted by numerals found on such corresponding parts in FIGURE 1. The operation of the FIGURE 2 schematic diagram will be clear from the foregoing description of the FIGURE 1 detailed arrangement.

The cable and servo system for braking the sun gear 41 is believed to be novel and is shown in FIGURES 3 and 4. Due to the peculiar structure and arrangement of the cable and servo mechanism and the control thereof, a brake of high capacity is provided. The brake, in spite of this high capacity feature may be engaged smoothly with minimum torque reaction shock. This is particularly advantageous when shifting from neutral to forward drive operation and also when shifting from high range or direct drive into low range drive.

Referring to FIGURES 3 and 4, brake drum 52 carries a cable 53 wrapped around the drum a plurality of turns and extending through a pulley 85. Both ends of cable 53 terminate in a cable clamp 86, the cable 53 being wrapped around drum, passed through pulley 85 and then returned to clamp 86. Pulley 85 is supported upon a piston rod 87 fixed to a piston 88. Piston 88 is positioned in a cylinder indicated generally at 89 formed in transmission housing 14. A cover plate 90, drilled to permit piston rod 87 to extend therethrough, is retained to the transmission housing 14 by means of a snap ring 91. A pair of control chambers 92 and 93 are provided at opposite sides of piston 88 for purposes hereafter more fully explained. A spring 94 yieldably biases piston 88 to its inner position in cylinder 89 as shown in FIGURE 3 wherein further movement of piston 88 is stopped by contact of piston 88 and cover plate 90.

Cable clamp 86 is carried by a piston 95 disposed in a cylinder generally indicated at 96 formed in transmission housing 14 and drilled to permit piston 95 and cable clamp 86 to extend therethrough. Housing 14 carries a removable cup shaped cover 97. A spring 98 yieldably biases piston 95 to the inner permissible range of travel of the piston in cylinder 96. Further motion of piston 95 is prevented by contact of the piston and housing 14. A nut 99 may be easily adjusted to adjust the cable with respect to drum 52. A control chamber 100 between piston 95 and the bottom of cylinder 96 formed by housing 14 may receive fluid under pressure under suitable controls as hereafter more fully explained. Control chambers 92 and 93 of piston 88 may likewise receive fluid under pressure as hereafter more fully explained. This piston 88 is substantially larger in diameter than piston 95. In the event that fluid pressure is exhausted from control chambers 92 and 100, the brake cable is adjusted such that the cable will be released from drum 52.

The hydraulic control system for controlling the drive condition of the transmission is shown in FIGURE 5. This control system, in general, includes an engine driven pump A, an output shaft driven pump B, a main line pressure regulator valve C, a vacuum controlled pressure modulator valve D, a shift valve E, a throttle valve F, a hydraulic governor G, and a driver operable drive range selector valve I.

*Main line pressure regulator valve*

The main line pressure regulator valve C is composed of a valve body 110 having four lands 111, 112, 113 and 114 formed thereon. A valve housing 115 has nine ports 116, 117, 118, 119, 120, 121, 122, 123 and 124 formed therein. A spring 125 yieldably biases valve body 110 to a position wherein land 111 blocks off port 118 when the vehicle is stopped and the engine turned off. Lands 111, 112 and 113 are of equal diameter, while land 114 is of lesser diameter than any of these three lands. A plunger 127 will assist spring 125 to bias valve 110 to the right upon admission of fluid under pressure to a control chamber 126 adjacent plunger 127. Two additional control chambers 128 and 129 are associated with valve C for purposes hereafter more fully explained.

*Pump supply*

Fluid under pressure is supplied to main line pressure regulator valve C by means of engine driven pump A and tailshaft driven pump B. Thus, with the engine running and the vehicle standing still pump A will constitute the fluid pressure source. As the vehicle is placed in motion, pump B contributes to the fluid pressure supply and may at times constitute the sole source of pressure. A main line pressure supply passage 217 is connected in the system intermediate a pair of check valves J and K. In normal starting with the engine running and the vehicle standing still, check valve J will be open to permit fluid from pump J to passage 217. At the same time check valve K will be closed to prevent discharge of fluid from pump A through pump B. In case the vehicle is being pushed or towed to start the engine, check valve J will be closed while check valve K will be open to admit fluid from pump B to passage 217.

*Vacuum controlled pressure modulator valve*

The vacuum controlled pressure modulator valve D serves to modify the functioning of pressure regulator valve C to vary the line pressure in the system in accordance with changes in torque demand expressed as a function of variation of engine intake manifold vacuum. Valve D includes a valve body 130 having lands 131 and 132 thereon disposed in a valve housing 133. A stem 134 is secured to a diaphragm 135 in a casing 136. A chamber 137 at one side of diaphragm 135 is connected to atmosphere through a port 138. A chamber 139 at the opposite side of diaphragm 135 is connected to the vehicle engine intake manifold (not shown) through a nipple 140 and suitable tubing (not shown). Valve casing 133 is provided with five ports 142, 143, 144, 145 and 146. A control chamber 147 is connected to port 144 by way of a passage 148 having a restriction 149 disposed therein.

*Drive range selector valve*

Drive range selector valve I includes a stem 150 having a pair of spaced lands 151 and 152 formed thereon and disposed in a valve housing 153 having eight ports 154, 155, 156, 157, 158, 159, 160 and 161 therein. The drive range selector valve may be positioned to select neutral, low range forward, high range forward, or reverse as the driver may choose. The valve is positioned for low range forward drive in FIGURE 5.

*Hydraulic governor*

Governor valve G illustrated schematically in FIGURE 5a is a well known type of hydraulic governor adapted to receive fluid under pressure and to deliver fluid under a variable pressure which changes proportional to the speed of rotation of the governor value. Governors of the type which may be employed are shown, for example, in the United States patent to Hans O. Schjolin 2,764,269, issued September 25, 1956 and in the patent to Robert M. Schaefer et al. 2,782,658, issued February 26, 1957. Accordingly, further explanation of the governor per se is not believed necessary. The governor shown receives fluid from the tailshaft driven pump B by way of a governor supply passage 218 and is adapted to deliver a variable pressure which increases with increase in vehicle speed to a governor pressure delivery passage 228.

Shift valve

Shift valve E includes a stem 165 having lands 166, 167, 168 of equal diameter and a relatively large piston 169 formed thereon and disposed within a housing 170. Also disposed in housing 170 is a plunger 171 and a pair of springs 172 and 173. The springs seat on an annular seat 174 and serve to yieldably bias valve E to its downshift or low gear position illustrated. Associated with plunger 171 are a series of ports 175, 176, 177 and 178. The position of plunger 171 in housing 170 is determined by fluid pressure admitted to a chamber 179 and spring chamber 180. A passage 176a hydraulically connects ports 176 to spring chamber 180 through port 178. A series of ports 181, 182, 183, 184, 185, 186 and 187 are associated with shift valve E. Ports 181 and 187 connect governor pressure delivery passage 228 to control chambers 188 and 189 associated with piston 169 and land 168, respectively.

Throttle valve

Throttle valve F is controlled by the vehicle accelerator pedal (not shown) and functions to deliver a variable pressure which increases with engine throttle opening to chambers 179 and 180 to oppose the effect of governor delivered pressure in control chambers 188 and 189. Thus the position of shift valve E is determined as a function of vehicle speed and torque demand. Throttle valve F includes a stem 190 having lands 191 and 192 formed thereon and disposed in a valve housing 193. Ports 194, 195, 196 and 197 are associated with valve E. A control chamber 198 at one end of land 192 is adapted to receive fluid from throttle valve pressure delivery passage 230. A plunger 200 is disposed in casing 193, there being a spring 201 disposed between plunger 200 and land 191 of throttle valve F. A stop member 202 limits the movement of plunger 200 to the left as viewed in FIGURE 5a. Plunger 200 carries a stem 203 extending outwardly from casing 193 and adapted to be controlled by mechanism (not shown) controlled by the vehicle accelerator pedal (not shown) so as to force plunger 200 into casing 193 to compress spring 201 as the accelerator pedal is moved from a throttle closing to a throttle opening position. The position of throttle valve F in casing 193 depends upon the position of plunger 200 in casing 193. A so-called forced downshift valve 205 having a pair of spaced lands 206 and 207 is disposed in casing 193 with one end thereof extending outwardly from the casing. A spring 208 seated on stop member 202 opposes movement of valve 205 into the casing. Three ports 209, 210 and 211 are associated with downshift valve 205. Valve 205 is normally positioned as shown in FIGURE 5a wherein land 207 blocks off port 210 from port 211 and wherein port 211 is connected to exhaust port 209. Suitable accelerator pedal actuated mechanism (not shown) is arranged to contact the end of land 206 exterior of casing 193 so as to force downshift valve 205 into casing 193 against spring 208 when the accelerator pedal is depressed a predetermined amount. Thus, there is a range of motion of the accelerator pedal (not shown) wherein stem 203 is forced into casing 193 but in which valve 205 is not forced into the casing as the accelerator is depressed to open the engine throttle. There is a second range of movement at or near full open throttle position wherein downshift valve is moved into casing 193 block off exhaust port 209 and to connect port 210 to port 211. This occurs at a time when the pressure delivered by throttle valve F to throttle valve delivery passage 230 is at or near its maximum pressure, which pressure is line pressure.

Considering the hydraulic control system piping connections in FIGURES 5 and 5a, engine driven pump A draws control fluid from a sump (not shown) through a suction passage 215 and delivers the same to supply port 119 of pressure regulator valve C by way of a passage 216. Front pump pressure from passage 216 passes through check valve J to a main line pressure supply passage 217 connected to port 121 of pressure regulator valve C and to port 145 of pressure modulator valve D. Rear pump B, driven by the vehicle drive shaft is effective when the vehicle is in motion to deliver fluid under pressure to rear pump pressure delivery passage 218 connected to a governor supply port 212 of governor G and through check valve K to passage 217. Pressure regulator valve C is positioned by spring 125 to connect port 121 to port 122 which port is connected to main line supply passage 219. Passage 219 is connected to port 123 and control chamber 128 of valve C and to port 156 of drive range selector valve I. Since land 113 of valve C is of greater diameter than land 114, fluid pressure in chamber 128 will tend to move valve C to compress spring 125. Such movement of valve C will crack port 118 to permit fluid from passage 216 to return to the suction side of pump A through exhaust port 118 and pressure dump passage 221. Front pump pressure supply passage 217 is connected to torque converter feed passage 220 by way of ports 121 and 120 to supply fluid to the torque converter and for transmission lubrication. In all forward drive range positions of drive range selector valve I, fluid under pressure is admitted to control chamber 129 of pressure regulator valve C by way of passage 219, ports 156 and 158 of valve I, passage 222 and port 124 of valve C. Fluid pressure in chambers 128 and 129 tend to move valve C to the left to connect port 118 to port 119 thereby connecting the front pump pressure delivery passage 216 to exhaust passage 221. When the drive range selector valve I is positioned for reverse operation, passage 222 is exhausted, the land 152 in this position of valve I being positioned to block off port 158 from port 156. Fluid in passage 222 will be dumped to exhaust through ports 158 and 161 of valve I. In reverse operation a substantially higher line pressure is maintained in the system than that furnished for forward drive.

Pressure regulator valve C is controlled by pressure modulator valve D to vary the line pressure delivered by valve C in accordance with changes in torque demand. Control chamber 126 of valve C is connected to port 143 of valve D by a passage 223. Spring 141 yieldably biases stem 134 to position valve D to connect pressure supply port 145 of valve D to pressure delivery port 143. Fluid pressure acting in control chamber 147 tends to move valve D in opposition to spring 141 to position valve D to block off port 145 and to connect port 143 to exhaust port 142. A passage 224 connects port 142 of valve D to port 160 of drive range selector valve I. In the high range position of valve I illustrated in FIGURE 5a, passage 224 is connected to exhaust through ports 160—161 of valve I. In the low range position of valve I, port 160 will be connected to port 156 so that passage 224 will be charged with line pressure. In low range position of valve I, the pressure modulator valve will deliver full line pressure to control chamber 126 of valve C so that the line pressure controlled by valve C will not vary in accordance with torque demand but will be maintained at a constant high pressure. With valve I positioned for high range operation as shown in FIGURE 5a, the position of modulator valve D is determined by the degree of vacuum in chamber 139. At closed engine throttle with maximum vacuum in chamber 139, the effective force of spring 141 is reduced such that a relatively low fluid pressure in chamber 147 is effective to position valve D to block off port 145 from port 143. The pressure in chamber 126 acting on plug 127 will therefore be relatively low so that pressure regulator valve C will deliver a relatively low pressure to passage 219. As the accelerator pedal is depressed to open the engine throttle, vacuum in chamber 139 will diminish thereby rendering spring 141 more effective to bias valve D to connect ports 145 and 143. The pressure delivered to chamber 126 of valve C will therefore increase as the engine throttle is opened, and this pressure in chamber 126 will render valve C effective to deliver increased pressure to passage 219 in accordance with increase in torque demand. In the low range position of drive range selector valve I, maximum pressure is maintained in chamber 126 to cause valve C to deliver a relatively high pressure irrespective of the torque demand. This permits the band servos to be fully engaged at closed throttle so that slippage of the bands will be prevented. This is particularly advantageous when descending long or steep grades in low range with closed throttle to take advantage of maximum overrun engine braking. As heretofore stated, in reverse position of valve I, passage 222 is connected to exhaust to provide a substantially higher line pressure than that obtained in either forward drive range position of valve I.

Port 159 of drive range selector valve I is connected to ports 182 and 186 of shift valve E and to chamber 92 of large servo piston 88 by means of a passage 225. In low range and drive range positions of selector valve I, passage 225 will be supplied with fluid pressure by way of ports 156 and 159 of valve I. In neutral and reverse positions of valve I, passage 225 will be connected to exhaust by way of ports 159 and 161 of valve I. Port 183 of shift valve E is connected to clutch servo chamber 59 and to spring chamber 93 of large band servo 89 by a passage 226. Port 184 of valve E is an exhaust port. Servo chamber 100 of small band piston 95 is connected to port 185 of shift valve E by means of a passage 227. Control chambers 188 and 189 are connected to a governor pressure delivery passage 228 by way of ports 181 and 187 respectively. A pressure supply passage 229 connects port 157 of drive range selector valve I to port 196 of throttle valve F. Ports 195 and 197 of throttle valve F and port 210 of downshift valve 205 are connected to control chamber 179 of plug 171 through port 175 of casing 170 by means of a passage 230. Port 211 of downshift valve 205 is connected to port 177 adjacent control chamber 180 by a passage 231. Ports 209 and 194 in casing 193 are exhaust ports.

*Control system operation*

With the vehicle standing still with the engine running and with the drive range selector valve D positioned for drive range operation as shown in FIGURE 5a, shift valve E will be positioned by springs 172, 173 as shown. Line pressure from supply passage 219 will be delivered through the manual valve to passages 229, 222 and 225. Fluid pressure will be delivered to servo chamber 92 through passage 225. Fluid pressure will also be delivered to passage 227 connected to servo chamber 100 by way of ports 186 and 185 of shift valve E.

Considering the transmission to be conditioned for neutral or no drive operation, the passage 227, which is connected to passage 225 by way of ports 185 and 186 of shift valve E, and passage 225 are both connected to exhaust by way of ports 159 and 161 of drive range selector valve I.

The action of the cable brake and brake servos upon shift from neutral to drive range is believed novel and results in a smooth application of the cable to the brake drum. In neutral, the cable 53 is free of drum 52 so that at the moment that drive range selector valve I is moved from its neutral position to its drive range position shown in FIGURE 5, the drum 52 will be rotating freely in a direction of rotation opposite to the direction of rotation of crankshaft 8. Due to the direction of rotation of drum 52 with respect to the direction of wrap of cable 53 about drum 52, the large servo piston 88 initially acts as an anchor and momentarily does not move. Although fluid pressure is being applied to both servo chambers 92 and 100 (the two chambers being connected to the fluid pressure source in parallel) small piston 95 initially moves outwardly against spring 98 and initially applies band 53 to drum 52 without any self wrapping effect. This provides an initial braking of drum 52 without shock upon shifting valve I from its neutral to its drive range position. Due to the difference in cubic content of servo chambers 92 and 100 and to the loading of the drum by action of the small servo, the large servo piston 88 initially serves merely as an anchor. After the initial application of band 53 to drum 52 by small piston 95, the large piston 88 subsequently moves outwardly against spring 94 to apply load to the cable 53 from the side of drum 52 adjacent piston 88. Upon application of load to band 53 through movement of large piston 88, the band 53 becomes self-wrapping on drum 52 to prevent any slip of the band on the drum. With the increased forces applied upon the cable due to its self-wrapping effect, small piston 95 will be pulled in the direction of the force of spring 98 and against the direction of fluid pressure force in servo chamber 100 until the piston 95 reaches the bottom of its stroke. The small piston 95 thereupon becomes the anchor end while the large piston 88 is moved to compress spring 94. In the initial stage wherein large piston 88 serves as the anchor end, and before self-wrap of the band 53 occurs, there may be some slip of the band on drum 52. Once self-wrap of the band occurs, there is no more slip of the band on the drum, but movement of small piston 95 against the pressure in chamber 100 provides a cushioning effect for absorbing any grabbing tendencies or shocks which might otherwise occur during the period of self-wrap action. This cushioning effect resulting from the rocking motion permitted to the cable 53 with respect to drum 52 in the self-wrap interval remains effective to dampen any shocks until such time that braking of drum 52 against rotation is completed. It will readily be understood that the two stage braking of drum 52 upon shifting from neutral to drive permits the reaction sun gear 41 to be stopped from rotation smoothly and without any shock-loading as commonly occurs in transmissions of conventional design.

The arrangement of the servos and cable 53 functions to provide a stage of operation in which the cable tends to be self-wrapping on drum 52 whether the planetary gearing unit is receiving torque from the engine, as was assumed in the description above or whether the engine is being driven by the vehicle with the transmission in low gear. Assuming the transmission to be operating in low gear and that the engine power is cut off by release of the accelerator pedal the vehicle will tend to drive the engine through the transmission. It is important that cable 53 have adequate capacity to prevent rotation of drum 52 in this condition of operation, particularly in descending long or steep grades where maximum engine braking of the vehicle is required. Such overrun of the vehicle engine by the vehicle will cause a reversal of torque through the planetary gearing mechanism such that drum 52 will tend to rotate faster than engine crankshaft 8 in the same direction as crankshaft 8. Large piston 88 becomes the anchor end for cable 53, while small piston 95 moves outwardly against spring 98 to obtain a self-wrap effect of cable 53 on drum 52 during overrun in low gear. Before self-wrapping of the band occurs, the piston 88 is positioned by pressure in chamber 92 to compress spring 94. When small piston 95 has moved against spring 98 sufficiently to initiate the self-wrap effect of the cable 53 on overrun, the loading of the cable is sufficient to pull large piston 88 inwardly against the effect of fluid pressure in chamber 92 to the limit of its travel. Large piston 88 thereupon becomes a fixed anchor so long as overrun continues.

It will be apparent from the above that both on power drive and overrun in low gear a self-wrapping effect of cable 53 on drum 52 is obtained to assure adequate brake capacity. At the same time, due to the movement of pistons 88 and 95 shock loading due to the self-wrap application of the cable to drum 52 is avoided during periods of torque reversals.

Assuming that the vehicle is speeded up under power in low gear, but with drive range selector valve I in its drive range position, governor pressure in control chambers 188 and 189 will, at some vehicle speed depending upon throttle setting, be effective to move shift valve E to upshift the transmission. In its upshift position, shift valve E will be effective to connect pressure delivery passage 227 to exhaust by way of ports 185 and 184. This will exhaust fluid pressure from servo chamber 100. In its upshift position, shift valve E is also effective to deliver fluid under pressure from passage 225 to passage 226 by way of ports 182 and 183. This pressure in pressure passage 226 is conducted to clutch servo chamber 59 to apply clutch plates 54—55 and to cable servo chamber 93. Pressure in chamber 93 will cause piston 88 to move inwardly to loosen cable 53 irrespective of the fact that fluid pressure is maintained in servo chamber 92. The planetary gearing unit is thereby conditioned for direct drive wherein sun gear 32 is driven by the torque converter turbine and sun gear 41 is connected mechanically to the engine for rotation at engine crankshaft speed.

The timing of the automatic shift from low gear to direct drive depends upon vehicle speed and engine throttle position. The control pressure delivered by throttle valve F to passage 230 increases as the accelerator pedal is depressed. Governor pressure in passage 228 increases with increase in vehicle speed. Thus, with a high torque demand, the upshift will be delayed until a higher vehicle speed obtains than is the case with a small torque demand. A forced downshift for rapid acceleration under power may be had by depressing the accelerator pedal a sufficient amount to block off passage 231 from exhaust port 209 and to connect passage 231 to passage 230 by way of ports 210 and 211 of downshift valve 205.

Upon shifting from direct drive to reduction drive, the momentary "floating" action of the band servo pistons occurs in a manner similar to the shift from neutral to drive with the cable application being again arrived at in two steps. The first step is the initial cable application without self-wrap of the cable and the second step is the stage wherein self-wrap occurs. In this latter stage the forces applied to the cable due to self-wrap of the cable being sufficient to rock the pistons with respect to the drum to reverse the fixed anchor end of the cable. Thus, a smooth downshift from direct drive to reduction drive is obtained whether the downshift is a forced downshift under engine power or a normal closed throttle downshift.

For reverse operation valve I is positioned to connect connect reverse servo chamber 48 and reverse pressure supply passage 232 to line pressure supply passage 219 by way of ports 155 and 156 of valve I. In reverse, passage 225 is connected to exhaust through ports 159 and 161 of valve I to dump pressure from servo chambers 92 and 100 to release the cable 53. Servo chambers 93 and 59 are exhausted through passage 226, port 183 and exhaust port 184 of shift valve E. Thus, for reverse operation, only ring gear 42 of the planetary gearing unit is held against rotation.

It will be apparent from the foregoing description that there has been provided a combination fluid torque converter and planetary gearing unit constructed and arranged such that the gear unit is driven solely by the torque converter in reduction drive and partially by the converter and partially directly by the engine in direct drive. The arrangement assures maximum economy with minimum converter slip loss when operating in direct drive. At the same time the converter is maintained in the drive train in direct gear drive to provide hydrodynamic torque multiplication under heavy torque demand in direct drive. The vibration dampening capacity of the converter is retained in direct drive as well as low gear drive. The transmission is arranged in the vehicle with the converter at one side of the axle and the gear unit at the opposite side of the axle with the three concentric shafts extending into the space between the converter and gear unit. The arrangement is advantageous in that the transmission may be positioned longitudinally in the vehicle with minimum vertical space requirement at a point above the axle. The cable and servo arrangement provides a brake of high capacity and particularly adapted for smooth engagement. The hydraulic control system line pressure supplied to the clutch servo chamber 59 is varied through action of the vacuum operated valve D and line pressure regulator valve C to vary the rate of engagement of clutch plate 55 in accordance with torque demand. The line pressure will be relatively low at light throttle conditions and relatively high at full throttle condition and vary with throttle settings in between. Thus the plate clutch 55 will be engaged smoothly irrespective of throttle setting due to its hydraulic actuation. The hydraulically controlled band and clutch servos provide for smooth ratio change with minimum shock and adequate brake and clutch capacity for long useful life.

What is claimed is:

1. A transmission including a hydrodynamic power transmitting unit having an engine driven impeller and a turbine, a planetary gearing unit having a planet carrier supporting a plurality of sets of planet gears in mesh with each other, a power delivery shaft driven by said planet carrier, a first sun gear in mesh with one of said sets of planet gears, a drive connection between said turbine and said sun gear and extending through said power delivery shaft, a second sun gear in mesh with the other of said sets of planet gears, brake means selectively operable to brake said second sun gear against rotation to establish drive of said power delivery shaft by said turbine and through reduction drive of said planetary gearing unit, a shaft directly connected to and continuously driven by said engine and connected for rotation with said impeller by a connection external of said hydrodynamic power transmitting unit, said last mentioned shaft extending through said aforementioned drive connection, and an engageable and releasable clutch driven by said engine driven shaft and adapted to clutch said second sun gear to said engine when engaged to establish drive of said power delivery shaft partially by said turbine and partially by said engine independently of said turbine.

2. A transmission as set forth in claim 1 including an engageable and releasable brake on said planet carrier adapted to prevent rotation of said power delivery shaft when said brake is engaged.

3. A transmission for transmitting power from an engine drive shaft to a final power delivery shaft including a hydrodynamic torque converter and a planetary gearing unit; said torque converter having an impeller driven by said engine drive shaft, a reaction member, and turbine, said planetary gearing unit including a planet carrier supporting a relatively long planet gear in mesh with a relatively short planet gear, a sun gear in mesh with said long planet gear and a second sun gear in mesh with said short planet gear, said final power delivery shaft being driven by said carrier, a drive connection between said first-mentioned sun gear and said torque converter turbine concentric with and extending through said planet carrier and said final power delivery shaft, a selectively operable clutch associated with said second sun gear having one element thereof continuously driven directly by said engine drive shaft by means of a second shaft extending through said drive connection between said turbine and said first-mentioned sun gear and continuously driven by said engine drive shaft through a drive connection to said impeller and external of the path of fluid flow through said hydrodynamic torque converter, selectively operable means for braking said second sun gear against rotation to establish low range of operation in said planetary gearing unit, selectively operable means for engaging said clutch to establish high range operation in said planetary gearing unit, said first-mentioned sun gear being driven by said turbine at the torque multiplication ratio of said torque converter in both low range and high range conditions of operation of said planetary gearing unit, and said second-mentioned sun gear being driven by said engine independently of said torque converter in high range condition of operation of said planetary gearing unit.

4. A transmission for transmitting power from an engine drive shaft to a final power delivery shaft including a hydrodynamic torque converter and a planetary gearing unit spaced from said torque converter, said torque converter having an impeller driven by said engine drive shaft, a reaction member and a turbine, said planetary gearing unit including a planet carrier supporting a relatively long planet gear in mesh with a relatively short planet gear, a first sun gear in mesh with said long planet gear, a second sun gear in mesh with said short planet gear, said final power delivery shaft being driven by said planet carrier and extending outwardly from said planetary gearing unit into the space between said planetary gearing unit and said torque converter, means for connecting said first sun gear to said turbine, an engageable and releasable clutch associated with said second sun gear having one element thereof continuously driven directly by said engine driven by means of an additional shaft extending through the drive connection between said turbine and said first sun gear and connected for rotation with said impeller by a drive connection external of the path of fluid flow through said torque converter, selectively operable brake means associated with said second sun gear, means for applying said brake means to establish low range drive through said planetary gearing unit, means for applying said clutch to establish high range drive through said gearing unit, said torgue converter turbine being effective to drive said first sun gear at the torque multiplication ratio of said converter unit irrespective of the drive range condition of operation of said planetary gearing unit.

5. A transmission for transmitting power from an engine drive shaft to a final power delivery shaft including a hydraulic power transmitting unit having an impeller driven by said engine drive shaft and a turbine, a planetary gearing unit including a planet carrier supporting a relatively long planet pinion in mesh with a relatively short planetary pinion, said final power delivery shaft being driven by said carrier, a first sun gear in mesh with said long pinion, a second sun gear in mesh with said short pinion, a drive connection between said first sun gear and said turbine and extending through said final power delivery shaft, a clutch member operatively associated with said second sun gear, a drive connection between said clutch member and said engine drive shaft and extending through said first-mentioned drive connection, said clutch drive connection including a shroud member external of the fluid flow path of fluid in said hydraulic power transmitting unit and connected for rotation with said impeller and engine drive shaft, selectively operable brake means for braking said second sun gear against rotation to establish low range operation through said planetary gearing unit, and selectively operable means for drivingly connecting said clutch member to said second sun gear to establish high range drive through said planetary gearing unit.

6. A transmission for transmitting power from an engine drive shaft to a final power delivery shaft including a hydraulic power transmitting unit having an impeller driven by said engine drive shaft and a turbine, a planetary gearing unit spaced from said hydraulic power transmitting unit and including a planet carrier supporting a relatively long planetary pinion gear in mesh with a relatively short planetary pinion gear, said final power delivery shaft being driven by said carrier and extending into the space between said planetary gearing unit and said hydraulic power transmitting unit, a power input sun gear in mesh with said long planet pinion gear, a hollow shaft extending through said final power delivery shaft and forming a drive connection between said sun gear and said turbine, a second sun gear in mesh with said short planetary pinion gear, selectively operable means for braking said second sun gear to establish low range drive through said planetary gearing unit, an engageable and releasable clutch member operably associated with said second sun gear, a drive connection between said clutch member and said engine drive shaft comprising a shaft extending through said hollow shaft and including a shroud member external of the "path" of fluid flow through said hydraulic power transmitting unit for connecting said last-mentioned shaft to said impeller and said engine drive shaft for rotation therewith as a unit, and selectively operable clutch means for engaging said clutch member to establish high range operation through said planetary gearing unit.

7. A transmission for transmitting power from an engine drive shaft to a final power delivery shaft including a hydrodynamic torque converter unit and a planetary gearing unit, said torque converter including an impeller driven by said engine drive shaft, a reaction member and a turbine, said planetary gearing unit including a planet carrier, relatively long and relatively short planet gears supported by said carrier in mesh with each other, said final power delivery shaft being driven by said carrier, a power input sun gear in mesh with said long planet gear, means comprising a hollow shaft extending through said final power delivery shaft forming a drive connection between said power input sun gear and said torque converter turbine, a second sun gear in mesh with said short planetary pinion gear, selectively operable brake means for preventing rotation of said second sun gear to establish low range drive through said planetary gearing unit, a clutch member operatively associated with said second sun gear, means comprising a shaft extending through said first-mentioned hollow shaft forming a drive connection between said clutch member and said engine drive shaft and including a shroud member exterior of the path of fluid flow through said converter connected to said impeller and engine drive shaft for rotation therewith as a unit, and selectively operable means for engaging said clutch member to establish high range operation in said planetary gearing unit, said power input sun gear being driven at the torque multiplication ratio of said torque converter unit in both high range and low range conditions of operation of said planetary gearing unit.

8. A transmission for transmitting power from an engine drive shaft to a final power delivery shaft including a hydrodynamic torque converter having an impeller arranged to receive power from said engine drive shaft, a reaction member, and a turbine member, a planetary gearing unit including a planet carrier, relatively short and relatively long planet gears supported by said carrier in mesh with each other, a final power delivery shaft driven by said carrier, a power input sun gear in mesh with said relatively long planet gear, means comprising a hollow shaft extending through said final power delivery shaft forming a drive connection between said sun gear and said torque converter turbine, a sun gear and a ring gear, respectively, in mesh with said relatively short planet gear, selectively operable brake means for preventing rotation of said ring gear to establish reverse drive, selectively operable brake means for preventing rotation of said last-mentioned sun gear to establish reduction drive through said torque converter turbine and said planetary gearing unit, a clutch member associated with said last-mentioned sun gear, means comprising a shaft extending through said first-mentioned hollow shaft forming a drive connection between said clutch member and said engine drive shaft and including a shroud member external of the path of fluid flow through said converter connected to said impeller and said engine drive shaft for rotation therewith as a unit, and means for engaging said clutch member for establishing a mechanical connection between said last-mentioned sun gear and said engine drive shaft.

9. A transmission for transmitting power from an engine drive shaft to a final power delivery shaft including a hydraulic power transmitting unit having a power input member arranged to receive power from said engine drive shaft and a power delivery member, a planetary gearing unit including a planet carrier supporting a relatively short planet gear in mesh with a relatively long planet gear, said planetary gearing unit being spaced from said hydraulic torque transmitting unit, a final power delivery shaft driven by said carrier extending into and terminating in the space between said hydraulic power transmitting unit and terminating in said space, a power input sun gear in mesh with said relatively long planet gear, a hollow shaft extending through said final delivery shaft forming a drive connection between said sun gear and the power delivery member of said hydraulic torque transmitting mechanism, a sun gear and a ring gear in mesh with said relatively short planet gear, selectively operable brake means for preventing rotation of said ring gear to establish reverse drive of said power delivery shaft, selectively operable brake means for preventing rotation of said last-mentioned sun gear to establish low gear drive of said final power delivery shaft, a driving clutch member operatively associated with said last-mentioned sun gear, a drive connection between said clutch member and said engine drive shaft comprising a shaft extending through said hollow shaft and including a shroud exterior of the path of fluid flow through said hydraulic power transmitting unit connected for rotation as a unit with said power input member and said engine drive shaft, and means associated with said clutch member selectively operable to engage said clutch member to said last-mentioned sun gear to establish high range drive of said final output shaft.

10. A transmission according to claim 9 including a selectively operable brake associated with said planet carrier for opposing rotation of said carrier.

11. A transmission for transmitting power from an engine drive shaft to a final power delivery shaft comprising a hydraulic torque transmitting unit including an impeller arranged to receive power from said engine drive shaft, a planetary gearing unit having a planet carrier supporting a relatively long planet gear in mesh with a relatively short planet gear and a sun gear, means connecting said sun gear to the power delivery unit of said hydraulic torque transmitting mechanism, a final power delivery shaft connected to said planet carrier and extending between said hydraulic torque transmitting unit and said planetary gearing unit, a ring gear in mesh with said short planetary pinion gear, a sun gear in mesh with said short planetary pinion gear, a clutch member, a direct mechanical drive connection between said clutch member and said engine drive shaft extending through the connecting means between the first-mentioned sun gear and said power delivery unit of said hydraulic torque transmitting unit and including a shroud exterior of the path of fluid flow through said hydraulic torque transmitting unit connected for rotation as a unit with said impeller and engine drive shaft, selectively operable means for engaging said clutch to rotate said last-mentioned sun gear, and selectively operable means for braking said sun gear and to permit rotation of said sun gear.

12. A transmission for transmitting power from an engine drive shaft to a final power delivery shaft including a hydraulic power transmitting unit having a power input member arranged to receive power from said engine drive shaft and a power delivery member, a planetary gearing unit including a planet carrier supporting a relatively short planet gear in mesh with a relatively long planet gear, a final power delivery shaft connected to said carrier, a power input sun gear in mesh with said relatively long planet gear, a drive connection between said sun gear and said power delivery member of said hydraulic power transmitting unit, said drive connection extending through said final power delivery shaft, a sun gear and a ring gear, respectively, in mesh with said relatively short planet gear, a selectively operable brake for preventing rotation of said ring gear to establish reverse drive of said final power delivery shaft, a clutch member operatively associated with said last-mentioned sun gear, a drive connection between said clutch member and said engine drive shaft and including a shaft extending through said first-mentioned drive connection and including a shroud exterior of the path of fluid flow through said hydraulic power transmitting unit connected for rotation as a unit with said power input member and said engine drive shaft, selectively operable means for engaging said clutch mechanism for drivingly connecting said last-mentioned sun gear to said engine drive shaft, and selectively operable brake means for braking said sun gear against rotation.

13. A transmission for transmitting power from an engine drive shaft to a final power delivery shaft including a hydraulic power transmitting unit arranged to receive power from said engine drive shaft, a planetary gearing unit spaced from said hydraulic power transmitting unit and including a planet carrier supporting a relatively short planet gear in mesh with a relatively long planet gear, a final power delivery shaft connected to said carrier, a power input sun gear in mesh with said relatively long pinion gear, a hollow shaft extending through said final power delivery shaft and forming a drive connection between said power input sun gear and said hydraulic power transmitting unit, a sun gear and a ring gear, respectively, in mesh with said relatively short planet gear, a selectively operable means for braking said ring gear, selectively operable means for braking said last-mentioned sun gear, a clutch member associated with said last-mentioned sun gear, a drive connection between said clutch member and said engine drive shaft comprising a shaft extending through said hollow shaft and including a shroud extending exterior of the path of fluid flow through said hydraulic power transmitting unit and connected for rotation as a unit with said power input member and said engine drive shaft and selectively operable means for engaging said clutch to complete a mechanical drive connection between said last-mentioned sun gear and said engine drive shaft.

14. A transmission for transmitting power from an engine drive shaft to a final power delivery shaft including a hydrodynamic torque converter having a power input member arranged to receive power from said engine drive shaft, a reaction member, and a turbine, a planetary gearing unit spaced from said torque converter including a planet carrier supporting a relatively short planet gear in mesh with a relatively long planet gear, a final power delivery shaft adapted to receive power from said carrier and extending into the space between said torque converter and said planetary gearing unit, a sun gear in mesh with said long planet gear, means forming a drive connection between said sun gear and said turbine extending through said power delivery shaft, a sun gear in mesh with said short planet pinion, a drive clutch associated with said last-mentioned sun gear, means connecting said drive clutch to said engine shaft and extending through said first-mentioned drive connection and including a shroud extending exterior of the path of fluid flow through said converter and connected for rotation as a unit with said power input member and said engine drive shaft, means for braking said last-mentioned sun gear for low range drive, and means for engaging said clutch for selecting high range drive, said first-mentioned sun gear of said planetary gearing unit being driven by said torque converter turbine and subject to the torque multiplication effect of said torque converter in both low range and high range condition of operation, said second sun gear being driven by said engine independently of said torque converter in high range operation of said gearing unit.

15. A transmission including a first housing enclosing a hydrodynamic torque converter unit, a second housing spaced from said first housing enclosing a planetary gearing unit, a third housing extending between said first and second housing, said torque converter unit including an impeller, turbine and a reaction member, an engine driven shaft extending into said first housing, means rotatably supporting said engine driven shaft in said first housing, said planetary gearing unit comprising a planet carrier supporting a first set of planet pinions in mesh with a second set of planet pinions, a first sun gear in mesh with said first set of planet pinions, and a second sun gear in mesh with said second set of planet pinions; a drum member fixed to said second sun gear for rotation therewith, a second shaft extending through all three of said housings, said second shaft being supported on said engine driven shaft and upon said second housing, a drive connection common to said impeller and said second shaft for connecting said impeller and said second shaft to each other for rotation as a unit with said engine driven shaft, a third shaft comprising a hollow sleeve supported for rotation on said second shaft connecting said first sun gear to said turbine for rotation with said turbine, a fourth shaft driven by said carrier comprising a hollow sleeve extending into said third casing, said second and third shafts each extending through said fourth shaft, a power delivery gear fixed to said fourth shaft for rotation therewith, a bearing between said fourth shaft and said first casing adjacent said power delivery gear, an additional bearing between said fourth shaft and said third housing, a clutch plate driven by said second shaft and extending into said drum, a brake associated with said drum effective when engaged to brake said second sun gear against rotation, said engine driven shaft being effective to drive said power delivery gear through a single torque path including said turbine, first sun gear, said planet gears and said carrier when said brake is applied to prevent rotation of said second sun gear, said engine driven shaft being effective to drive said power delivery gear through a pair of torque paths including said first-mentioned torque path and a second torque path when said clutch plate is engaged to said drum, said second torque path including said second shaft and said second sun gear, and means for selectively engaging said brake and said clutch plate.

16. A transmission including a hydrodynamic torque converter unit and a planetary gearing unit, said converter including an engine driven impeller, a turbine and a reaction member, said planetary gearing unit including a planet carrier supporting first and second sets of planet pinions in mesh with each other, a first sun gear in mesh with said first set of planet pinions, and a second sun gear in mesh with said second set of planet pinions, a first quill shaft driven by said planet carrier constituting the final power delivery member of said gear unit, a drive connection between said first sun gear and said turbine comprising a second quill shaft extending through said first quill shaft and said carrier, a clutch drum fixed to said second sun gear, a third shaft continuously driven by said engine and extending through said second quill shaft, a clutch plate driven by said third shaft and extending into said clutch drum, a fluid pressure responsive servo in said drum adapted to engage said clutch to said drum upon admission of fluid pressure thereto, a brake cable wrapped around said drum and adapted to be applied thereto, means for applying said cable to said drum including a pair of fluid pressure responsive servos operatively connected to said brake cable, a fluid pressure source, valve means for controlling the admission of fluid pressure from said source to said servos, said valve means being effective in one position to direct fluid pressure to both of said brake servos to apply said cable to said drum, said servos being effective upon admission of pressure thereto to apply said cable in two stages, one of said servos being initially a fixed reaction member and subsequently being movable to complete the engagement of said cable to said drum, said valve means being movable to a second position to connect said brake servos to exhaust and to admit pressure to said clutch to engage the same, said turbine being effective to drive said first sun gear when said clutch is released to establish drive of said carrier through a first torque path, said third shaft being effective to drive said second sun gear when said clutch is engaged, said first and second sun gears being effective to drive said carrier simultaneously through two torque paths when said clutch is engaged.

17. A transmission including a hydrodynamic torque converter unit and a planetary gearing unit, said converter including an engine driven impeller, a turbine and a reaction member, said planetary gearing unit including a planet carrier supporting a first set of planet pinions in mesh with a second set of planet pinions, a first quill shaft driven by said carrier and constituting the power delivery member of said gearing, a first sun gear in mesh with said first set of planet pinions, means directly connecting said first sun gear to said turbine comprising a second quill shaft extending through said first quill shaft, a second sun gear in mesh with said second set of planet pinions, a drum member fixed to said second sun gear, a third shaft continuously driven by said engine and extending through said second quill shaft, a clutch disposed within said drum and continuously rotated by said third shaft, a fluid pressure responsive clutch servo disposed in said drum for engaging said clutch to said drum, a brake cable wrapped around said drum and adapted to be applied thereto, means for applying said cable to said drum by a two-stage application including a pair of fluid pressure responsive servos, one of said brake servos being initially held against movement with respect to said drum and the second of said servos being initially movable with respect to said drum to initiate cable engagement to said drum, both of said servos being movable with respect to said drum by cable tension forces during the final stage of application of said cable to said drum, a fluid pressure source, and valve means effective in one position to direct fluid pressure to said brake servos to establish drive of said carrier through a first torque path including said first sun gear, said valve means being movable to a second position to admit fluid pressure to said clutch servo and to connect said brake servos to exhaust to establish drive of said carrier simultaneously through two torque paths including both of said sun gears.

18. A transmission including a hydrodynamic torque converter unit and a planetary gearing unit, said converter including an engine driven impeller, a turbine and a reaction member, said planetary gearing unit including a planet carrier supporting a first set of planet pinions in mesh with a second set of planet pinions, a first quill shaft driven by said carrier and constituting the power delivery member of said gearing, a first sun gear in mesh with said first set of planet pinions, a drive connection directly connecting said first sun gear to said turbine for rotation as a unit therewith comprising a second quill shaft extending through said first quill shaft, a second sun gear in mesh with said second set of planet pinions, a drum fixed to said second sun gear, a third shaft extending through said second quill shaft and continuously driven by said engine, a clutch disposed within said drum and continuously driven by said third shaft, a fluid pressure responsive clutch servo disposed within said drum for engaging said clutch to said drum, a brake cable associated with said drum and adapted to be applied to said drum, means for applying said cable to said drum by a two-stage application including a pair of fluid pressure responsive servos of different diameter, one of said brake servos initially providing a fixed cable anchor and the other of said brake servos being movable with respect to said drum to initially apply said cable to said drum, both of said servos being movable with respect to said drum by cable tension forces during the final stage of application of said cable to said drum, a fluid pressure source, and control valving for controlling the admission of fluid pressure from said source to said servos, said control valving being effective in one position to direct fluid pressure to both of said brake servos to establish drive of said carrier through said first sun gear, said control valving being effective in a second position to connect said brake servos to exhaust and to direct fluid pressure to said clutch servo to establish drive of said carrier simultaneously through said first sun gear, said third shaft, said clutch, and said second sun gear.

19. A transmission including a hydrodynamic torque converter unit and a planetary gearing unit, said converter including an engine driven impeller, a turbine and a reaction member, said planetary gearing unit including a planet carrier supporting first and second sets of planet pinions in mesh with each other, a first quill shaft driven by said carrier, a first sun gear in mesh with said first set of planet pinions, a second quill shaft extending through said first quill shaft and connecting said first sun gear to said turbine for rotation with said turbine, a second sun gear in mesh with said second set of planet pinions, a drum fixed to said second sun gear, a third shaft extending through said second quill shaft and continuously rotated by said engine, a clutch plate driven by said third shaft and extending into said drum, a fluid pressure responsive clutch servo disposed within said drum for engaging said clutch plate to said drum, a brake cable associated with said drum and adapted to be applied thereto, said cable being wrapped around said drum a plurality of turns to provide a self-wrapping effect in its engaging action, a pair of fluid pressure responsive brake servos associated with said cable for applying said cable to said drum by a multiple stage action, one of said brake servos providing a fixed cable anchor and the other of said brake servos being movable in one direction with respect to said drum during initial application of said cable to said drum, both of said brake servos being movable in the opposite direction with respect to said drum by tension forces set up in said cable due to self-wrap engagement of said cable on said drum during the final stage of cable engagement on said drum, a fluid pressure source, control valving for controlling the admission of fluid pressure to all three of said servos, said valving being effective in one position to direct fluid pressure from said source to both of said brake servos to establish drive of said carrier through said first sun gear, said control valving being effective in a second position to connect both of said brake servos to exhaust and to direct fluid pressure from said source to said clutch servo to establish drive of said planet carrier by way of said shaft, said clutch and said second sun gear simultaneously with drive of said carrier by way of said turbine and said first sun gear.

20. A transmission including a hydrodynamic torque converter unit and a planetary gearing unit, said converter having an engine driven impeller, a turbine and a reaction member, said planetary gearing unit including a planet carrier supporting first and second sets of planet pinions in mesh with each other, a first quill shaft driven by said carrier, a first sun gear in mesh with said first set of planet pinions, a second quill shaft extending through said first quill shaft and connecting said first sun gear to said turbine for rotation therewith, a second sun gear in mesh with said second set of planet pinions, a drum fixed to said second sun gear, a third shaft extending through said second quill shaft and continuously driven by said engine, a clutch plate driven by said third shaft and extending into said drum, a fluid pressure responsive clutch servo disposed in said drum for engaging said clutch plate to said drum, a brake cable wrapped around said drum and adapted to be applied thereto, a pair of brake servos associated with said cable each having a chamber adapted to receive fluid pressure to move said cable toward a position wherein said cable is applied to said drum, one of said brake servos having a second chamber adapted to receive fluid pressure to release said cable from said drum, a fluid pressure source, a shift valve, a drive range selector valve effective in one position to hydraulically connect one of said first-mentioned brake servo chambers and said shift valve to said fluid pressure source, said shift valve being effective in one position to connect the other of said brake servo chambers to said fluid pressure source to apply said cable to said drum to establish drive of said carrier through said turbine and said first sun gear, said shift valve being effective in a second position to connect said last-mentioned brake servo chamber to exhaust and to deliver fluid pressure from said source to said clutch servo to apply said clutch and to deliver fluid pressure from said source to said brake servo release chamber to release said cable from said drum to establish drive of said carrier through said engine driven shaft, said clutch and second sun gear simultaneous with drive of said carrier by said first sun gear and said turbine.

21. A transmission including a hydrodynamic torque converter and a planetary gearing unit, said converter including an engine driven impeller, a turbine and a reaction member, said gearing unit including a planet carrier supporting first and second sets of planet pinions in mesh with each other, a first quill shaft driven by said carrier, a first sun gear in mesh with said first set of planet pinions, a second quill shaft extending through said first quill shaft and connecting said first sun gear to said turbine for rotation therewith, a second sun gear in mesh with said second set of planet pinions, a drum fixed to said second sun gear, a third shaft extending through said second quill shaft and continuously driven by said engine, a clutch plate driven by said third shaft and extending into said drum, a fluid pressure responsive clutch servo disposed in said drum for engaging said clutch plate to said drum, a brake cable wrapped around said drum and adapted to be applied thereto, fluid pressure responsive mechanism for applying said cable to said drum to establish drive of said carrier solely by way of said turbine and first sun gear including a pair of brake servo motors, each of said brake servo motors having a chamber adapted to receive fluid pressure to yieldably bias said servo motors toward a cable engaging position, a second servo chamber in one of said brake servo motors adapted to receive fluid under pressure to release said cable from said drum, a fluid pressure source, control means for controlling the admission of fluid pressure from said source to said brake servo chambers and said clutch servo including a drive range selector valve and a shift valve, said shift valve being effective in one position thereof to hydraulically connect said first-mentioned servo chambers of said pair of brake servo motors in hydraulic parallel arrangement with said fluid pressure source to establish drive of said carrier through said turbine and first sun gear, said clutch servo and said brake servo release chamber being connected in hydraulic series relationship, said shift valve being effective in a second position to connect said clutch servo and said brake servo release chamber to said fluid pressure source to establish drive of said carrier through said third shaft, said clutch plate and said second sun gear simultaneously with drive of said carrier through said turbine and said first sun gear.

22. A transmission including a hydrodynamic torque converter unit and a planetary gearing unit, said converter including an engine driven impeller, a turbine and a reaction member, said planetary gearing unit including a planet carrier supporting a first set of planet pinions in mesh with a second set of planet pinions, a first quill shaft driven by said carrier terminating between said gear unit and torque converter, a first sun gear in mesh with said first set of planet pinions, a second quill shaft extending through said first quill shaft and connecting said first sun gear to said turbine for rotation therewith, a second sun gear in mesh with said second set of planet pinions, a drum fixed to said second sun gear, a third shaft extending through said second quill shaft and continuously driven by said engine, a clutch plate driven by said third shaft and extending into said drum, a fluid pressure responsive clutch servo disposed within said drum and adapted to engage said clutch to said drum, a brake cable wrapped around said drum and adapted to be applied thereto to brake said drum against rotation, a pair of spaced brake servos of different diameter associated with said cable each having a control chamber adapted to receive fluid pressure to apply said cable to said drum, the larger of said servos having a control chamber adapted to receive fluid pressure to release said cable from said drum irrespective of the effect of fluid pressure in said first-mentioned brake servo control chambers, said clutch servo and said brake servo release chamber being hydraulically connected in series, a fluid pressure source, means for controlling the admission of fluid pressure from said source to said servos including a drive range selector valve and a shift valve, said drive range selector valve being effective in one position to deliver fluid pressure to said shift valve and to one control chamber of said relatively large diameter brake servo, said shift valve being effective in one position to connect the control chamber of said relatively small diameter brake servo and one of the control chambers of said relatively large diameter brake servo to said source to apply said cable to said drum to establish drive of said carrier by said turbine and said first sun gear, said shift valve being movable to a second position to connect the control chamber of said relatively small diameter brake servo to exhaust and to deliver fluid pressure to said clutch servo and to said release chamber of said relatively large diameter brake servo to establish drive of said carrier simultaneously through both of said sun gears.

23. A transmission including a hydrodynamic torque converter, said torque converter including an impeller, a turbine, and a reaction member, a planetary gearing unit comprising a planet carrier supporting a first set of planet pinions in mesh with a second set of planet pinions, a first sun gear in mesh with said first set of planet pinions, a second sun gear in mesh with said second set of planet pinions, a drum fixed to said second sun gear for rotation therewith, an engine driven drive shaft, a second shaft, a rotatable casing enclosing said converter and forming a chamber for working fluid, said casing forming a drive connection between said drive shaft, said impeller and said second shaft whereby said drive shaft, said impeller and said second shaft all rotate as a unit, a third shaft concentric with said second shaft supported for rotation on said second shaft connecting said first sun gear to said turbine for rotation therewith as a unit, said second shaft extending through said third shaft, a fourth shaft driven by said carrier comprising a hollow sleeve through which said second and third shafts extend, a power delivery gear fixed to said fourth shaft for rotation therewith, a friction clutch plate driven by said second shaft and extending into said drum, a brake associated with said drum effective when engaged to brake said second sun gear against rotation, said engine driven drive shaft being effective to drive said power delivery gear through a single torque path including said turbine, said third shaft, said first sun gear, said planet gears, said carrier and said fourth shaft when said brake is applied to prevent rotation of said second sun gear, said engine driven drive shaft being effective to drive said power delivery delivery gear through a pair of torque paths including said first mentioned torque path and a second torque path when said clutch plate is engaged to said drum, said second torque path including said rotatable casing, said second shaft and said second sun gear, and means for selectively engaging said brake and said clutch plate.

References Cited in the file of this patent

UNITED STATES PATENTS

| 782,547 | Coffee | Feb. 14, 1905 |
|---|---|---|
| 2,691,902 | Lyons | Oct. 19, 1954 |
| 2,693,260 | Lucia | Nov. 2, 1954 |
| 2,695,533 | Pollard | Nov. 30, 1954 |
| 2,861,474 | Moore | Nov. 25, 1958 |
| 2,889,715 | De Lorean | June 9, 1959 |
| 2,893,266 | Kelley | July 7, 1959 |

UNITED STATES PATENT OFFICE

CERTIFICATE OF CORRECTION

Patent No. 3,003,367                                          October 10, 1961

Frank J. Winchell

It is hereby certified that error appears in the above numbered patent requiring correction and that the said Letters Patent should read as corrected below.

Column 7, line 3, for "value" read -- valve --; column 10, line 64, for "reveral" read -- reversal --; column 11, line 61, strike out "connect"; column 13, line 35, after "driven" insert -- shaft --; column 22, line 32, strike out "delivery".

Signed and sealed this 10th day of April 1962.

(SEAL)
Attest:

ERNEST W. SWIDER                                    DAVID L. LADD
Attesting Officer                                        Commissioner of Patents